United States Patent
Tsubouchi et al.

(10) Patent No.: US 7,013,643 B2
(45) Date of Patent: Mar. 21, 2006

(54) MASTER CYLINDER

(75) Inventors: Kaoru Tsubouchi, Toyota (JP); Katsuhiro Mita, Gamagori (JP)

(73) Assignee: Advics Co., Ltd., Aichi (JP)

( * ) Notice: Subject to any disclaimer, the term of this patent is extended or adjusted under 35 U.S.C. 154(b) by 15 days.

(21) Appl. No.: 10/895,124

(22) Filed: Jul. 21, 2004

(65) Prior Publication Data

US 2005/0016173 A1    Jan. 27, 2005

(30) Foreign Application Priority Data

Jul. 23, 2003  (JP) .............................. 2003-200498

(51) Int. Cl.
*F15B 7/08*    (2006.01)
(52) U.S. Cl. ......................... 60/588; 60/562
(58) Field of Classification Search ................ 60/562, 60/585, 588
See application file for complete search history.

(56) References Cited

U.S. PATENT DOCUMENTS 4,524,585 A    6/1985  Coll et al.
5,617,725 A *  4/1997  Yasuda .......................... 60/562
6,463,737 B1 * 10/2002  Inoue et al. ................... 60/562

FOREIGN PATENT DOCUMENTS

FR    2 820 387    8/2002

* cited by examiner

*Primary Examiner*—Thomas E. Lazo
*Assistant Examiner*—Michael Leslie
(74) *Attorney, Agent, or Firm*—Buchanan Ingersoll PC

(57) ABSTRACT

A master cylinder includes a cylinder body and a piston slidably inserted in the cylinder while kept in slide contact with two cup members both fitted in the inner surface of the cylinder body to seal the gap between the piston and the inner surface of the cylinder body. On its radially inner surface, the cylinder body is formed with first to third piston guide portions. Each piston guide portion is formed with an odd number of grooves arranged at circumferentially equal distances. Each groove of each piston guide portion axially aligns with the corresponding grooves of the other piston guide portions. The circle including the bottoms of the grooves of the first guide portion has a diameter equal to or smaller than the rear opening of the cylinder body. The grooves of the first guide portion have a width gradually decreasing toward the front end thereof.

9 Claims, 2 Drawing Sheets

MASTER CYLINDER

BACKGROUND OF THE INVENTION

This invention relates to a master cylinder comprising a cylinder body, and a piston slidably inserted in the bore of the cylinder body so as to be kept in slide contact with a cup fitted in the inner wall of the bore to seal the gap between the outer surface of the piston and the inner wall of the bore.

The cup is sandwiched between piston guide portions formed on the inner wall of the cylinder body to guide the piston in slide contact with the piston. The piston guide portions are formed with grooves through which brake fluid is supplied from a reservoir into a pressure chamber defined in the cylinder body. By forming the grooves, brake fluid can be supplied from behind the cup, which is typically fitted in an annular groove formed in the inner wall of the bore of the cylinder body, to the front of the cup through these grooves.

Such grooves are disclosed in French patent 2820387 and U.S. Pat. No. 4,524,585. The grooves disclosed in the French patent are straight and helical grooves. The US patent discloses an even number of straight grooves that are arranged at equal circumferential intervals.

Specifically, the master cylinder of the French patent includes a cylinder body having piston guide portions formed on its radially inner surface and having an inner diameter slightly larger than the outer diameter of the piston so as to guide the piston while being in slide contact with the piston. The grooves are formed in the radially inner surface of each piston guide portion. The grooves have bottoms that lie on an imaginary cylinder having a diameter greater than the opening of the bore of the cylinder body. Such grooves can be formed only by machining and not by any other method. Thus, the productivity of the entire master cylinder is low especially where the grooves are helical grooves.

The grooves disclosed in the US patent have also bottoms that lie on an imaginary cylinder having a greater diameter than the opening of the bore of the cylinder body. The productivity of the entire master cylinder is thus low for the same reason as mentioned above.

An object of the present invention is to provide a master cylinder of the abovementioned type having grooves which can be formed easily and which are less likely to scratch or otherwise damage the piston even if the piston is rubbed against the edges of the grooves.

SUMMARY OF THE INVENTION

According to this invention, there is provided a master cylinder 1 comprising a cylinder body having a central axis, and front and rear ends with respect to the direction of the central axis, the cylinder body having an opening at the rear end, a primary piston slidably inserted in the cylinder body through the opening, thereby defining a first pressure chamber in the cylinder body, the first pressure chamber being filled with brake fluid which can be pressurized by the primary piston, the primary piston being directly in slide contact with and guided by the cylinder body, and a primary cup for the primary piston and a secondary cup both provided between a radially inner surface of the cylinder body and the primary piston, the secondary cup being located rearwardly of the primary cup to shut off communication between the interior of the cylinder body and outer air, the primary cup sealing a gap between the cylinder body and the primary piston, the cylinder body being provided with first, second and third piston guide portions on the radially inner surface thereof, the first piston guide portion being disposed between the primary cup and the secondary cup, the second piston guide portion being disposed between the primary cup and the first piston guide portion, the third piston guide portion being disposed forwardly of the primary cup, each of the first, second and third piston guide portions having a radially inner surface radially opposing the primary piston and formed with grooves extending parallel to the central axis of the cylinder body.

Preferably, the grooves of the first piston guide portion have bottoms that lie in a cylindrical surface having a diameter equal to or smaller than the diameter of the opening. Preferably, the grooves of the first piston guide portion are greater in dimension (width and depth) than the grooves of the second piston guide portions.

The master cylinder may further comprise a secondary piston disposed in front of the pressure chamber, thereby defining a second pressure chamber filled with brake pressure in the cylinder body in front of the secondary piston, whereby the hydraulic pressure in the first pressure chamber is transmitted to the second pressure chamber through the secondary piston, the secondary piston bearing the fluid pressure of the pressure chamber, a pressure cup sealing a gap between the radially inner surface of the cylinder body and the secondary piston, and a primary cup for the secondary piston, the primary cup for the secondary piston being disposed forwardly of the pressure cup, the cylinder body being provided with fourth, fifth and sixth piston guide portions on the radially inner surface thereof, the fourth piston guide portion being disposed between the primary cup for the secondary piston and the pressure cup, the fifth piston guide portion being disposed between the primary cup for the secondary piston and the fourth piston guide portion, the sixth piston guide portion being disposed forwardly of the primary cup for the secondary piston, each of the fourth, fifth and sixth piston guide portions having a radially inner surface radially opposing the secondary piston and formed with grooves extending parallel to the central axis of the cylinder body, each of the grooves formed in each of the fourth, fifth and sixth piston guide portions being aligned with one of the grooves formed in the first piston guide portion, and being equal in dimension to or slightly smaller than the grooves formed in the second and third piston guide portions.

Further preferably:

1) The first piston guide portion has a circumferential width that decreases progressively toward the front end of the cylinder body;
2) The grooves formed in each of the first to third or first to sixth piston guide portions are a common odd number of grooves that are arranged at equal circumferential intervals;
3) The master cylinder further includes a first annular groove formed between the first and second piston guide portions so as to communicate with the grooves formed in the first and second piston guide portions, the first annular groove having a radially outer portion communicating with the reservoir, and/or a second annular groove formed between the fourth and fifth piston guide portions so as to communicate with the grooves formed in the fourth and fifth piston guide portions, the second annular groove having a radially outer portion communicating with the reservoir;
4) The grooves formed in the piston guide portions disposed behind the primary cup for the primary piston and/or those formed in the piston guide portions disposed behind the primary cup for the secondary piston have a depth of 0.3–0.8 mm and a circumferential width of 0.5–1.2 mm; and/or 5) The second and/or fifth piston guide portion, which is disposed immediately behind the respective primary piston, has a radially inner diameter that is slightly greater than the other piston guide portions.

The grooves formed in the piston guide portions extend straight in the axial direction of the cylinder body and are simple in shape, so that they can be easily formed. In one arrangement, the grooves of the first piston guide portion have bottoms that lie on an imaginary cylinder having a diameter equal to or smaller than the opening of the bore of the cylinder body. With this arrangement, the grooves of the first piston guide portion can be formed by using a core when the cylinder body is formed by forging. The grooves of the other piston guide portions can be easily and efficiently formed using e.g. a broach. Productivity is thus high.

Preferably, the grooves of the first piston guide portion have a dimension greater than the grooves of the second piston guide portion. With this arrangement, even if the grooves are formed by molding, a tool such as a broach can be inserted into the cylinder body without the least possibility of the tool interfering with the cylinder body.

Preferably, the grooves of the first piston guide portion have a circumferential width that progressively decreases toward the front end of the first guide portion. With this arrangement, the possibility of the primary piston getting scratches decreases.

For example, the primary piston of a tandem master cylinder tends to be subjected to uneven loads when the primary piston is pushed into the cylinder body. Under such uneven loads, the primary piston tends to incline, thus rubbing against the side edges of the grooves formed in the first piston guide portion. If the grooves formed in the first piston guide portion have a constant width, that is, if the side edges of these grooves extend parallel to the axis of the cylinder body, the piston will come into contact with and rub against the side edges of these grooves along narrow linear areas thereof as the piston is pushed into the cylinder body. Thus, the piston tends to get scratches along these narrow linear areas.

To solve this problem, in the present invention, the grooves of the first piston guide portion preferably have a progressively decreasing circumferential width toward the front end thereof. That is, the side edges of these grooves preferably extend obliquely relative to the central axis of the cylinder body. With this arrangement, when the primary piston is pushed into the cylinder body while inclined under uneven loads, the piston will rub against the side edges of the grooves of the first piston guide portion along relatively wide strips of areas thereof. Since the piston contacts the side edges of these grooves along wider areas of the surface of the piston, the piston is least likely to get scratches. Even if scratches are formed, they are shallow.

The primary piston is guided practically solely by the first piston guide portion. When the primary piston is pushed into the cylinder body while being inclined under uneven loads, the second and third piston guide portions hardly restrain the movement of the piston. Thus, the grooves formed in the second and third piston guide portions may be straight grooves, i.e. grooves having their side edges extending substantially parallel to the cylinder body.

The secondary piston, which moves under the pressure difference between the first and second pressure chambers, is much less subjected to uneven loads than the primary piston. This means that the secondary piston hardly inclines and thus hardly gets scratches. Thus, the grooves formed in the piston guide portions for guiding the secondary piston may also be straight grooves similar to the grooves of the second and third piston guide portions.

The grooves of each piston guide portion preferably consist of an odd number of grooves arranged at equal circumferential intervals. With this arrangement, any two of these grooves will not diametrically oppose each other. Thus, even if the piston inclines under uneven loads, it will never be sandwiched by diametrically opposite grooves, so that the restraining force applied to the piston is always weak. This further reduces the possibility of the piston getting scratches.

BRIEF DESCRIPTION OF THE DRAWINGS

Other features and objects of the present invention will become apparent from the following description and the accompanying drawings, in which.

DETAILED DESCRIPTION OF THE PREFERRED EMBODIMENT

Figure 1:
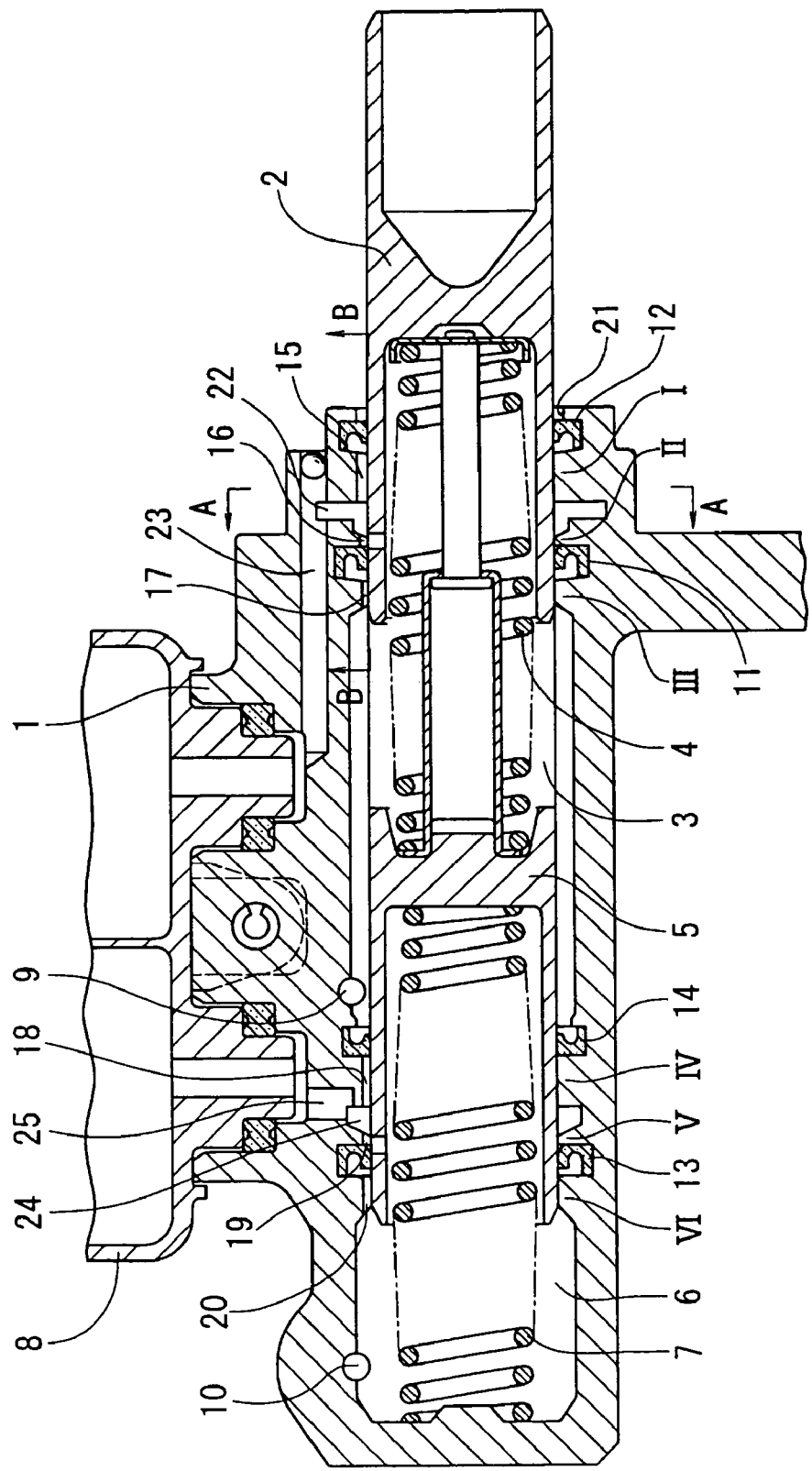
FIG. 1 is a sectional view of the master cylinder embodying the invention.
Figure 2:
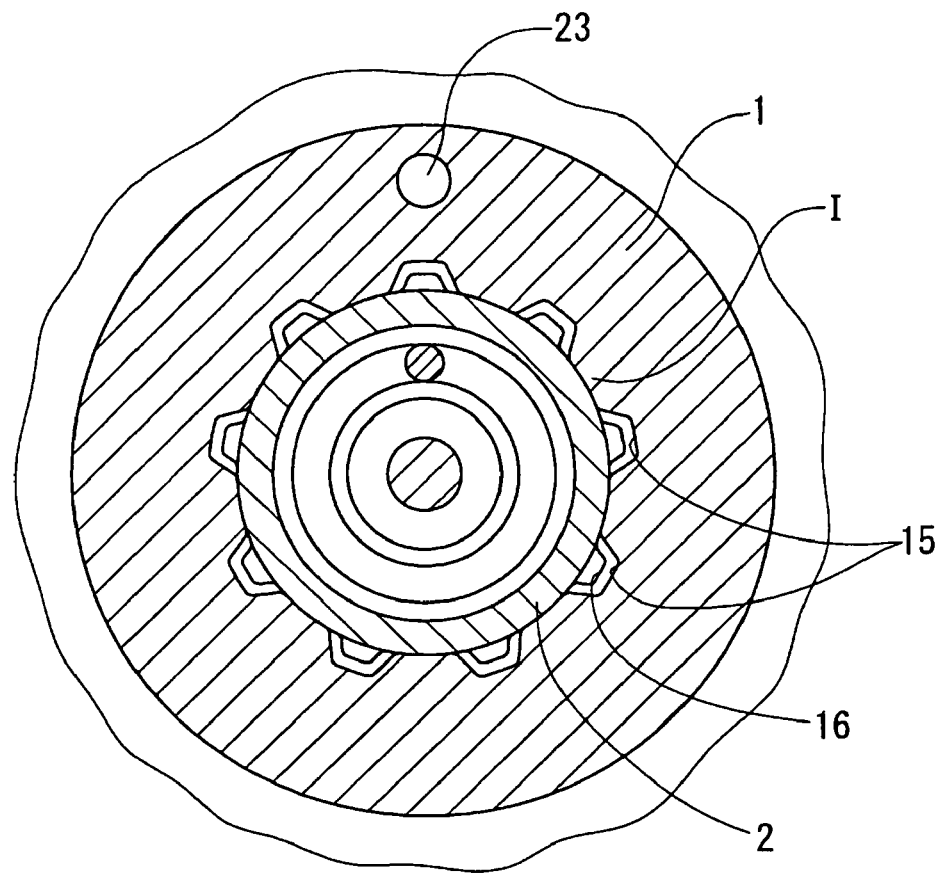
FIG. 2 is an enlarged sectional view taken along line A—A of FIG. 1.
Figure 3:
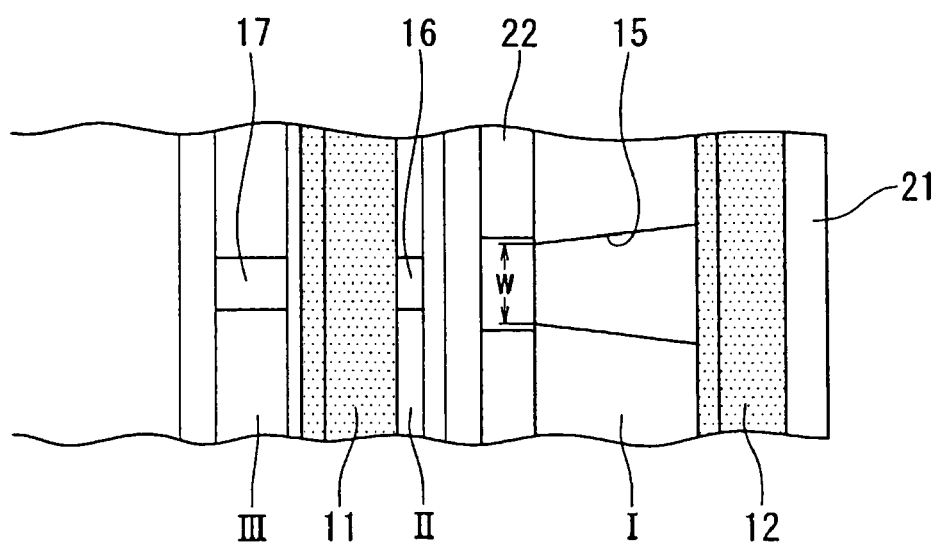
FIG. 3 is an enlarged sectional view taken along line B—B of FIG. 1.

Now referring to FIGS. 1–3, the master cylinder embodying the present invention includes a cylinder body 1, a primary piston 2 slidably inserted in the cylinder body 1, a secondary piston 5 slidably inserted in the cylinder body 1 forwardly (leftwardly in FIG. 1) of the primary piston 2, and a reservoir 8. A first pressure chamber 3 is defined in the cylinder body 1 between the primary piston 2 and the secondary piston 5. The first pressure chamber 3 is filled with brake fluid which is pressurized by the primary piston 2 to generate brake hydraulic pressure. A return spring 4 for the primary piston 2 is mounted in the first pressure chamber 3. A second pressure chamber 6 is defined in the cylinder body 1 between the end wall of the cylinder body 1 and the secondary piston 5 and is filled with brake fluid which is pressurized by the secondary piston 5 to generate brake hydraulic pressure. The first pressure chamber 3 has an output port 9. The second pressure chamber 6 has an output port 10.

Fitted in the inner peripheral surface of the cylinder body 1 are four cup members, i.e. a primary cup 11 pressed against the outer periphery of the primary piston 2 to seal the outer periphery of the piston 2, a secondary cup 12 pressed against the outer periphery of the primary piston 2 to shut off communication between the interior of the cylinder body 1 and the outer air, a primary cup 13 pressed against the outer periphery of the secondary piston 5 to seal the outer periphery of the piston 5, and a pressure cup 14 pressed against the outer periphery of the secondary piston 5 to shut off communication between the first pressure chamber 3 and the reservoir 8.

On its inner peripheral surface, the cylinder body 1 is formed with three piston guide portions I, II and III for guiding the primary piston 2, and three other piston guide portions IV, V and VI for guiding the second piston 5. The guide portions I–VI have inner diameters slightly greater than the outer diameter of the primary and secondary pistons 2 and 5, and are substantially in slide contact with the pistons 2 and 5 to guide their sliding movement.

The piston guide portion I, which is located closest, of the above six piston guide portions, to the right-hand (in FIG. 1)

opening of the cylinder body 1, is provided forwardly (leftwardly in FIG. 1) of the secondary cup 12. The piston guide portions II and III sandwich the primary cup 11 from back and front of the cup 11, respectively.

The piston guide portion IV is located forward of the pressure cup 14. The piston guide portions V and VI sandwich the primary cup 13 from back and front of the cup 13, respectively.

The piston guide portions II and V, which are located immediately behind the primary cups 11 and 13, respectively, may have slightly (e.g. about 0.1 mm) greater inner diameters than the other piston guide portions so that brake fluid can be smoothly drawn into the pressure chambers. In this case, the piston guide portions II and V may not practically contact the respective pistons.

In its radially inner surface, each of the piston guide portions I–VI is formed with a plurality of and odd number of (nine in the embodiment) grooves 15–20, which are the characterizing feature of the present invention.

As shown in FIG. 2, the grooves 15–20 formed in each of the piston guide portions extend parallel to the axis of the cylinder body 1 and arranged at equal angular intervals in the circumferential direction of the cylinder body 1. The grooves 15–20 of each piston guide portion are equal in number to the grooves 15–20 of any other piston guide portion, and each groove of any piston guide portion is axially aligned with the corresponding grooves of the other piston guide portions.

As shown in FIG. 3, each of the grooves 15 formed in the piston guide portion I, which is provided closest to the opening of the cylinder body 1, has side edges thereof inclined, relative to the axis of the cylinder body, in opposite directions to each other so that the (circumferential) width of the groove narrows forwardly. Further, the bottoms of the grooves 15 lie in an imaginary cylindrical surface having a diameter equal to or smaller than the rear (right-hand) opening of the cylinder body 1 and greater than the diameter of the imaginary cylindrical surface in which the bottoms of the grooves 16 and 17 of the piston guide portions II and III lie.

The grooves 16–20 of the piston guide portions II–VI are all straight grooves having their side edges extending parallel to the axis of the cylinder body 1.

The minimum width w of the grooves 15 (see FIG. 3) is equal to or slightly greater than the width of the grooves 16–20.

The grooves 15 of the piston guide portion I and the grooves 16 of the piston guide portion II communicate with each other through an annular groove 22 formed in the radially inner surface of the cylinder body 1 between the piston guide portions I and II. At its radially outer portion, the annular groove 22 communicates with a passage 23 leading to the reservoir 8. A similar annular groove 24 is formed in the radially inner surface of the cylinder body 1 between the piston guide portions IV and V. Like the groove 22, the groove 24 communicates at its radially outer portion with a passage 25 leading to the reservoir 8.

Most typically, the cup members of the invention are formed of a rubber having a hardness of 75–90 Hs. Because the primary cups 11 and 13 and the pressure cup 14 are formed of such a material, in order to prevent them from getting damaged to such an extent that they are practically unusable, the depth and width of the grooves 16, 18 and 19 of the piston guide portions II, IV and V are preferably determined at about 0.3–0.8 mm and about 0.5–1.2 mm, respectively.

Since there is a relatively large difference between the minimum width (at the deeper end) and the maximum width (near the opening of the cylinder body) of the grooves 15, if the primary piston 2 inclines under uneven loads, the piston will be pressed against the side edges of the grooves 15, not along its narrow linear areas, but along its fairly wide strips of areas having a width substantially equal to the difference in width of the grooves 15. Loads applied to the primary piston 2 from the cylinder body are thus dispersed to these wide strips of areas. Thus, the primary piston 2 is less likely to be damaged or at least less likely to be damaged severely.

Any two of the plurality of and odd number of grooves of each of the piston guide portions I–VI, which are circumferentially arranged at equal intervals, are not provided diametrically opposite to each other as shown e.g. in FIG. 2. Thus, even if the piston 2 or 5 is inclined under uneven loads, it will never be pressed by the side edges of any two grooves from diametrically opposite directions. The binding force by the grooves is thus relatively weak, so that the piston is less likely to be damaged.

The cylinder body 1 can be formed by casting using a core having ribs corresponding to the grooves 15. Then by removing the core, the grooves 15 are formed. The grooves 15 are thus formed not by machining. But instead of using the core, the grooves 15 may be formed by machining. But even in such a case, machining of the grooves 15 is easy because the grooves 15 are axial, straight, and simple in shape.

The other grooves 16–20 are even more easily and efficiently formed e.g. by using a broach because they are smaller in width than the minimum width w of the grooves 15, and the grooves of any piston guide portion are equal in number to the grooves of any other piston guide portion and axially aligned with the corresponding grooves of any other piston guide portion. While the grooves 16–20 of the embodiment are the same width and depth, the grooves 18, 19 and 20 may be slightly narrower and shallower than the grooves 16 and 17 so that the grooves 18–20 can be more easily formed.

Since the passages 23 and 25 leading to the reservoir 8 are connected to the radially outer portions of the annular grooves 22 and 24 as shown in FIG. 1, the layout of the passages 23 and 24 and the forming method thereof can be selected from a greater variety of options. This leads to improved productivity.

The grooves of the first to third piston guide portions can be formed easily because they extend parallel to the axis of the cylinder body. Preferably, the grooves of the first guide portion have their bottoms arranged on an imaginary cylindrical surface having a diameter equal to or smaller than the opening of the bore of the cylinder body. With this arrangement, the cylinder body is formed by casting using a core having ribs corresponding to the grooves. Then by simply removing the core, the grooves are formed. The grooves of the other piston guide portions can also be formed easily using e.g. a broach. Productivity of the entire master cylinder thus improves.

Preferably, the grooves of the first piston guide portion are greater in dimension than the grooves of the second piston guide portion. Additionally, if the master cylinder is a tandem master cylinder, the grooves of the piston guide portions for guiding the secondary piston are preferably equal to or slightly smaller in dimension than the grooves of the first piston guide portion. With this arrangement, a tool such as a broach can be inserted into the cylinder body without the least possibility of interfering with the inner wall of the cylinder body. The grooves can thus be formed more easily.

Preferably, the grooves of the first piston guide portion have a circumferential width progressively decreasing toward the front end of the first piston guide portion. With this arrangement, the primary piston will rub against the side edges of the grooves of the first piston guide portion along wide strips of areas thereof. Thus, the piston is less likely to get scratches, and can be kept practically free of any scratches that can impair the function of the piston.

Preferably, the grooves of each piston guide portion consist of an odd number of grooves arranged at circumferentially equal intervals. With this arrangement, the piston will never be sandwiched by any two diametrically opposite grooves. This reduces loads on the piston and thus the possibility of the piston getting scratches.

Preferably, an annular groove is formed between the piston guide portion in front of the secondary cup and the piston guide portion behind the primary cup so that its radialy outer portion communicates with a passage leading to the reservoir. With this arrangement, the passage leading to the reservoir can be designed with greater freedom using a method which can be selected from a wider variety of options. This also contributes to improved productivity.

Preferably, the grooves of the piston guide portions behind the primary cup or cups have a depth of 0.3–0.8 mm and a width of 0.5–1.2 mm so as to improve the durability of the primary cup(s) and the pressure cup to a practically acceptable level.

Overall, according to this invention, it is possible to improve the productivity of the master cylinder while keeping the piston or pistons scratch-free.

What is claimed is:

1. A master cylinder comprising a cylinder body having a central axis, and front and rear ends with respect to the direction of said central axis, said cylinder body having an opening at said rear end, a primary piston slidably inserted in said cylinder body through said opening, thereby defining a first pressure chamber in said cylinder body, said first pressure chamber being filled with brake fluid which can be pressurized by said primary piston, said primary piston being directly in slide contact with and guided by said cylinder body, and a primary cup for said primary piston and a secondary cup both provided between a radially inner surface of said cylinder body and said primary piston, said secondary cup being located rearwardly of said primary cup to shut off communication between the interior of said cylinder body and outer air, said primary cup sealing a gap between said cylinder body and said primary piston, said cylinder body being provided with first, second and third piston guide portions on the radially inner surface thereof, said first piston guide portion being disposed between said primary cup and said secondary cup, said second piston guide portion being disposed between said primary cup and said first piston guide portion, said third piston guide portion being disposed forwardly of said primary cup, each of said first, second and third piston guide portions having a radially inner surface radially opposing said primary piston and formed with grooves extending parallel to said central axis of said cylinder body.

2. The master cylinder of claim 1, wherein said grooves of said first piston guide portion have bottoms that lie in a cylindrical surface having a diameter equal to or smaller than the diameter of said opening.

3. The master cylinder of claim 1 wherein the grooves of said first piston guide portion are greater in dimension than the grooves of said second piston guide portions.

4. The master cylinder of claim 1, further comprising a secondary piston disposed in front of said pressure chamber, thereby defining a second pressure chamber filled with brake fluid in said cylinder body in front of said secondary piston, whereby the hydraulic pressure in said first pressure chamber is transmitted to said second pressure chamber through said secondary piston, said secondary piston bearing the fluid pressure of said pressure chamber, a pressure cup sealing a gap between the radially inner surface of said cylinder body and said secondary piston, and a primary cup for said secondary piston, said primary cup for said secondary piston being disposed forwardly of said pressure cup, said cylinder body being provided with fourth, fifth and sixth piston guide portions on the radially inner surface thereof, said fourth piston guide portion being disposed between said primary cup for said secondary piston and said pressure cup, said fifth piston guide portion being disposed between said primary cup for said secondary piston and said fourth piston guide portion, said sixth piston guide portion being disposed forwardly of said primary cup for said secondary piston, each of said fourth, fifth and sixth piston guide portions having a radially inner surface radially opposing said secondary piston and formed with grooves extending parallel to said central axis of said cylinder body, each of said grooves formed in each of said fourth, fifth and sixth piston guide portions being aligned with one of said grooves formed in said first piston guide portion, and being equal in dimension to or slightly smaller than said grooves formed in said second and third piston guide portions.

5. The master cylinder of claim 1 wherein said grooves of said first piston guide portion has a circumferential width that decreases progressively toward said front end of said cylinder body.

6. The master cylinder of claim 1 wherein said grooves formed in each of said first, second and third piston guide portions are a common odd number of grooves that are arranged at equal circumferential intervals.

7. The master cylinder of claim 4 further comprising a reservoir, and a first annular groove formed between said first and second piston guide portions so as to communicate with said grooves formed in said first and second piston guide portions, said first annular groove having a radially outer portion communicating with said reservoir, or a second annular groove formed between said fourth and fifth piston guide portions so as to communicate with said grooves formed in said fourth and fifth piston guide portions, said second annular groove having a radially outer portion communicating with said reservoir.

8. The master cylinder of claim 1 wherein said grooves formed in said first and second piston guide portions have a depth of 0.3–0.8 mm and a circumferential width of 0.5–1.2 mm.

9. The master cylinder of claim 4 wherein said second piston guide portion and said fifth piston guide portion have a radially inner diameter that is slightly greater than the other piston guide portions.

* * * * *